US00RE41919E

(19) United States
(12) Reissued Patent
Olivier et al.

(10) Patent Number: US RE41,919 E
(45) Date of Reissued Patent: Nov. 9, 2010

(54) RAPID DECRYPTION OF DATA BY KEY SYNCHRONIZATION AND INDEXING

(76) Inventors: Steve Olivier, 1171 Secret Trail, Sugar Hill, GA (US) 30518; Gary L. Pelkey, 500 Avery Creek Pointe, Woodstock, GA (US) 30188; David M. Placek, 4164 River Shoales Ct., Duluth, GA (US) 30097; Kevin Kennedy, 1025 River Laurel Dr., Suwanee, GA (US) 30024

(21) Appl. No.: 12/425,314

(22) Filed: Apr. 16, 2009

(Under 37 CFR 1.47)

Related U.S. Patent Documents

Reissue of:
(64) Patent No.: 7,206,411
Issued: Apr. 17, 2007
Appl. No.: 10/640,118
Filed: Aug. 13, 2003

U.S. Applications:
(60) Provisional application No. 60/482,235, filed on Jun. 25, 2003.

(51) Int. Cl.
*H04L 9/00* (2006.01)

(52) U.S. Cl. ..... 380/262; 380/44; 380/46
(58) Field of Classification Search ..... 380/37, 380/44, 46, 255, 260, 261–262, 270, 273; 708/250
See application file for complete search history.

(56) References Cited

U.S. PATENT DOCUMENTS 4,518,989 A 5/1985 Yabiki et al.

(Continued)

FOREIGN PATENT DOCUMENTS

EP 0993183 A2 4/2000
JP 2001-136085 5/2001
WO WO-9854642 A1 12/1998

OTHER PUBLICATIONS

Unknown, "Wegner Compel Control; The Advanced network control system user manual", *Wegener communications,* (May 2001).

Unknown, "Network cpontrol brochure", *Wegenar communications compel,* (Feb. 28, 2002).

Notification of Transmittalof the International Search Report and the Written Opinion of the international Searching Authority, Or the Declaration, (Jun. 23, 2006).

"Optibase MGW 3100 Brochure (2001)", (2001).

"Bridging DVB And IP Networks With Optibase's MGW 3100", Available from http://www.optibase.com.cn/html/solutions/white_papers/Bridging_DVB_and_IP.html on Jul. 11, 2002, (Jul. 11, 2002), 7 pages.

(Continued)

*Primary Examiner*—Hosuk Song

(57) ABSTRACT

A satellite broadcast conditional access system with key synchronization uses indexing of an authorization stream to quickly restart the decrypting process after short carrier fades and after carrier switches. The authorization stream includes cyphered seeds and index numbers which are sequentially sent to a group of receivers. The same authorization stream can also be broadcast multiple times to the group of receivers. A conditional access server selects a starting index number and increments the index number by a predefined value. The receivers have a memory to save the current index number for the authorization stream. Any receiver that loses its connection to the broadcast and thereafter reestablishes its connection can retrieve the latest index number being issued in the authorization stream and compare it with the stored index number. When the index numbers match or are within a defined threshold, the receiver will continue to decypher the seeds and decrypt the transport stream.

65 Claims, 7 Drawing Sheets

U.S. PATENT DOCUMENTS

| | | | |
|---|---|---|---|
| 4,538,176 | A | 8/1985 | Nakajima et al. |
| 4,578,531 | A | 3/1986 | Everhart et al. |
| 4,719,364 | A | 1/1988 | Pequet et al. |
| 4,723,283 | A | 2/1988 | Nagasawa et al. |
| 4,761,785 | A | 8/1988 | Clark et al. |
| 4,864,615 | A | 9/1989 | Bennett et al. |
| 4,887,296 | A | 12/1989 | Horne |
| 4,903,031 | A | 2/1990 | Yamada |
| 4,930,062 | A | 5/1990 | Yamada |
| 4,985,895 | A | 1/1991 | Pelkey |
| 5,019,910 | A | 5/1991 | Filmer |
| 5,029,232 | A | 7/1991 | Nall |
| 5,036,537 | A | 7/1991 | Jeffers et al. |
| 5,046,092 | A | 9/1991 | Walker et al. |
| 5,054,064 | A | 10/1991 | Walker et al. |
| 5,235,643 | A | 8/1993 | Anderson et al. |
| 5,367,571 | A | 11/1994 | Bowen et al. |
| 5,381,481 | A | 1/1995 | Gammie et al. |
| 5,404,505 | A | 4/1995 | Levinson |
| 5,410,326 | A | 4/1995 | Goldstein |
| 5,421,017 | A | 5/1995 | Scholz et al. |
| 5,440,632 | A | 8/1995 | Bacon et al. |
| 5,485,577 | A | 1/1996 | Eyer et al. |
| 5,550,576 | A | 8/1996 | Klosterman |
| 5,594,490 | A | 1/1997 | Dawson et al. |
| 5,644,354 | A | 7/1997 | Thompson et al. |
| 5,651,115 | A | 7/1997 | Hasebe et al. |
| 5,657,414 | A | 8/1997 | Lett et al. |
| 5,684,525 | A | 11/1997 | Klosterman |
| 5,694,334 | A | 12/1997 | Donahue et al. |
| 5,712,969 | A | 1/1998 | Zimmermann et al. |
| 5,717,887 | A | 2/1998 | Leslie |
| 5,751,950 | A | 5/1998 | Crisan |
| 5,754,938 | A | 5/1998 | Herz et al. |
| 5,761,406 | A | 6/1998 | Kobayashi et al. |
| 5,764,773 | A | 6/1998 | Nishiura |
| 5,799,083 | A | 8/1998 | Brothers et al. |
| 5,805,705 | A | 9/1998 | Gray |
| 5,815,409 | A | 9/1998 | Lee |
| 5,815,662 | A | 9/1998 | Ong |
| 5,828,402 | A | 10/1998 | Collings |
| 5,828,945 | A | 10/1998 | Klosterman |
| 5,864,621 | A | 1/1999 | Katznelson |
| 5,872,846 | A | 2/1999 | Ichikawa |
| 5,886,733 | A | 3/1999 | Zdepski et al. |
| 5,892,767 | A | 4/1999 | Bell et al. |
| 5,898,695 | A | 4/1999 | Fujii |
| 5,903,766 | A | 5/1999 | Walker et al. |
| 5,917,915 | A | 6/1999 | Hirose |
| 5,918,059 | A | 6/1999 | Tavallaei |
| 5,920,626 | A | 7/1999 | Durden et al. |
| 5,923,362 | A | 7/1999 | Klosterman |
| 5,930,515 | A | 7/1999 | Ducharme et al. |
| 5,936,660 | A | 8/1999 | Gurantz |
| 5,973,723 | A | 10/1999 | DeLuca |
| 5,987,518 | A | 11/1999 | Gotwald |
| 5,987,519 | A | 11/1999 | Peifer et al. |
| 5,991,800 | A | 11/1999 | Burke et al. |
| 5,999,654 | A | 12/1999 | Toujima et al. |
| 6,023,723 | A | 2/2000 | McCormick et al. |
| 6,025,869 | A | 2/2000 | Stas et al. |
| 6,026,439 | A | 2/2000 | Chowdhury et al. |
| 6,040,781 | A | 3/2000 | Murray |
| 6,040,850 | A | 3/2000 | Un et al. |
| 6,044,205 | A | 3/2000 | Reed et al. |
| 6,054,920 | A | 4/2000 | Smith et al. |
| 6,067,300 | A | 5/2000 | Baumert et al. |
| 6,072,983 | A | 6/2000 | Klosterman |
| 6,094,671 | A | 7/2000 | Chase et al. |
| 6,097,662 | A | 8/2000 | Itou |
| 6,101,180 | A | 8/2000 | Donahue et al. |
| 6,113,652 | A | 9/2000 | Lysik et al. |
| 6,115,824 | A | 9/2000 | Ha |
| 6,134,589 | A | 10/2000 | Hultgren |
| 6,154,745 | A | 11/2000 | Kari et al. |
| 6,157,722 | A | 12/2000 | Lerner et al. |
| 6,163,809 | A | 12/2000 | Buckley |
| 6,169,802 | B1 | 1/2001 | Lerner |
| 6,173,330 | B1 | 1/2001 | Guo et al. |
| 6,182,187 | B1 | 1/2001 | Cox et al. |
| 6,219,422 | B1 | 4/2001 | Sato |
| 6,222,923 | B1 | 4/2001 | Schwenk |
| 6,230,163 | B1 | 5/2001 | Thijssen |
| 6,240,188 | B1 | 5/2001 | Dondeti et al. |
| 6,246,752 | B1 | 6/2001 | Bscheider et al. |
| 6,250,930 | B1 | 6/2001 | Mintz |
| 6,252,652 | B1 | 6/2001 | Kung et al. |
| 6,253,027 | B1 | 6/2001 | Weber et al. |
| 6,262,982 | B1 | 7/2001 | Donahue et al. |
| 6,266,339 | B1 | 7/2001 | Donahue et al. |
| 6,266,810 | B1 | 7/2001 | Tanaka et al. |
| 6,272,549 | B1 | 8/2001 | Daniel |
| 6,292,586 | B1 | 9/2001 | Kawakami et al. |
| 6,317,162 | B1 | 11/2001 | Matsumoto |
| 6,331,876 | B1 | 12/2001 | Koster et al. |
| 6,332,198 | B1 | 12/2001 | Simons et al. |
| 6,343,379 | B1 | 1/2002 | Ozawa et al. |
| 6,351,524 | B1 | 2/2002 | Schuster et al. |
| 6,359,636 | B1 | 3/2002 | Schindler et al. |
| 6,373,948 | B1 | 4/2002 | Wool |
| 6,377,981 | B1 | 4/2002 | Ollikainen et al. |
| 6,378,129 | B1 | 4/2002 | Zetts |
| 6,385,647 | B1 | 5/2002 | Willis et al. |
| 6,393,585 | B1 | 5/2002 | Houha et al. |
| 6,400,265 | B1 | 6/2002 | Saylor et al. |
| 6,401,242 | B1 | 6/2002 | Eyer et al. |
| 6,411,616 | B1 | 6/2002 | Donahue et al. |
| 6,415,329 | B1 | 7/2002 | Gelman et al. |
| 6,421,674 | B1 | 7/2002 | Yoakum et al. |
| 6,424,714 | B1 | 7/2002 | Wasilewski et al. |
| 6,424,717 | B1 | 7/2002 | Pinder et al. |
| 6,425,127 | B1 | 7/2002 | Bates et al. |
| 6,430,223 | B1 | 8/2002 | Lim |
| 6,449,634 | B1 | 9/2002 | Capiel |
| 6,463,059 | B1 | 10/2002 | Movshovich et al. |
| 6,466,765 | B1 | 10/2002 | Tanaka et al. |
| 6,467,093 | B1 | 10/2002 | Inoue et al. |
| 6,470,496 | B1 | 10/2002 | Kato et al. |
| 6,477,647 | B1 | 11/2002 | Venkatraman et al. |
| 6,487,589 | B1 | 11/2002 | Yoshino et al. |
| 6,487,721 | B1 | 11/2002 | Safadi |
| 6,487,723 | B1 | 11/2002 | MacInnis |
| 6,490,353 | B1 * | 12/2002 | Tan ..... 380/37 |
| 6,493,871 | B1 | 12/2002 | McGuire et al. |
| 6,493,876 | B1 | 12/2002 | DeFreese et al. |
| 6,510,454 | B1 | 1/2003 | Walukiewicz |
| 6,515,376 | B1 | 2/2003 | Mederer |
| 6,516,412 | B2 | 2/2003 | Wasilewski |
| 6,516,467 | B1 | 2/2003 | Schindler et al. |
| 6,557,052 | B1 | 4/2003 | Kubo |
| 6,574,733 | B1 | 6/2003 | Langford |
| 6,577,806 | B1 | 6/2003 | Hirota |
| 6,615,404 | B1 | 9/2003 | Garfunkel et al. |
| 6,714,973 | B1 | 3/2004 | Heiske et al. |
| 6,731,323 | B2 | 5/2004 | Doss et al. |
| 6,738,808 | B1 | 5/2004 | Enzmann et al. |
| 6,792,269 | B2 | 9/2004 | Boehmke |
| 6,859,787 | B2 | 2/2005 | Fisher et al. |
| 7,007,050 | B2 | 2/2006 | Saarinen |
| 7,089,561 | B2 | 8/2006 | Morrison et al. |
| 2001/0003846 | A1 | 6/2001 | Rowe et al. |

2001/0005902 A1 6/2001 Bacon et al.
2001/0021997 A1 9/2001 Lee
2001/0043573 A1 11/2001 Kelly
2001/0044934 A1 11/2001 Hirai et al.
2002/0000831 A1 1/2002 Smith
2002/0007418 A1 1/2002 Hegde et al.
2002/0007485 A1 1/2002 Rodriguez et al.
2002/0007494 A1 1/2002 Hodge
2002/0010936 A1 1/2002 Adam
2002/0010938 A1 1/2002 Zhang et al.
2002/0023143 A1 2/2002 Stephenson et al.
2002/0023165 A1 2/2002 Lahr
2002/0026645 A1 2/2002 Son et al.
2002/0034179 A1 3/2002 Ollikainen et al.
2002/0035730 A1 3/2002 Ollikainen et al.
2002/0040475 A1 4/2002 Yap et al.
2002/0041337 A1 4/2002 Candelore
2002/0044094 A1 4/2002 May
2002/0046407 A1 4/2002 Franco et al.
2002/0047899 A1 4/2002 Son et al.
2002/0053073 A1 5/2002 Shimamoto
2002/0056122 A1 5/2002 Yokoyama
2002/0059256 A1 5/2002 Halim et al.
2002/0065891 A1 5/2002 Malik et al.
2002/0069295 A1 6/2002 Edwards et al.
2002/0071434 A1 6/2002 Furukawa
2002/0083441 A1 6/2002 Flickinger et al.
2002/0095600 A1 7/2002 Deen et al.
2002/0095676 A1 7/2002 Knee et al.
2002/0095689 A1 7/2002 Novak
2002/0104097 A1 8/2002 Jerding et al.
2002/0105976 A1 8/2002 Kelly et al.
2002/0108124 A1 8/2002 Sato
2002/0108126 A1 8/2002 Horowitz et al.
2002/0108128 A1 8/2002 Lash et al.
2002/0112076 A1 8/2002 Rueda et al.
2002/0120885 A1 8/2002 Choi et al.
2002/0124243 A1 9/2002 Broeksteeg et al.
2002/0124249 A1 9/2002 Shintani et al.
2002/0129364 A1 9/2002 Smith et al.
2002/0131428 A1 9/2002 Pecus et al.
2002/0136218 A1 9/2002 Cardoso
2002/0138641 A1 9/2002 Taylor et al.
2002/0138852 A1 9/2002 Reynolds et al.
2002/0144291 A1 10/2002 Smiley et al.
2002/0146125 A1 10/2002 Eskicioglu et al.
2002/0150102 A1 10/2002 Janko et al.
2002/0152467 A1 10/2002 Fiallos
2002/0161997 A1 10/2002 Yamasaki et al.
2002/0163935 A1 11/2002 Paatela et al.
2002/0178360 A1 11/2002 Wenocur et al.
2002/0184339 A1 12/2002 Mackintosh et al.
2002/0184529 A1 12/2002 Foster et al.
2002/0184642 A1 12/2002 Lude et al.
2002/0184651 A1 12/2002 Matsushita
2002/0191640 A1 12/2002 Haymes et al.
2002/0194260 A1 12/2002 Headley et al.
2002/0194595 A1 12/2002 Miller et al.
2002/0199001 A1 12/2002 Wenocur et al.
2002/0199096 A1 12/2002 Wenocur et al.
2003/0003904 A1 1/2003 Matsumoto
2003/0005037 A1 1/2003 Aija et al.
2003/0005439 A1 1/2003 Rovira
2003/0005444 A1 1/2003 Crinon et al.
2003/0009694 A1 1/2003 Wenocur et al.
2003/0009769 A1 1/2003 Hensgen et al.
2003/0012190 A1 1/2003 Kaku et al.
2003/0014767 A1 1/2003 Stumphauzer
2003/0016664 A1 1/2003 MeLampy et al.
2003/0018912 A1 1/2003 Boyle et al.
2003/0046708 A1 3/2003 Jutzi
2006/0059024 A1 3/2003 Bailey et al.
2003/0093327 A1 5/2003 Roberts et al.
2003/0106064 A1 6/2003 Plourde
2003/0110511 A1 6/2003 Schutte et al.
2003/0135605 A1 7/2003 Penkadur
2003/0140107 A1 7/2003 Rezvani et al.
2003/0154475 A1 8/2003 Rodriguez et al.
2003/0154492 A1 8/2003 Falvo et al.
2003/0163821 A1 8/2003 Knutson et al.
2003/0111911 A1 12/2003 Hsu
2004/0122489 A1 6/2004 Mazar et al.

OTHER PUBLICATIONS

"MPEG–2 Transport Stream Description", Rev. 2.29.00, *Compiled by Ron Wallace,* (Feb. 29, 2000), 35 pages.

* cited by examiner

RAPID DECRYPTION OF DATA BY KEY SYNCHRONIZATION AND INDEXING

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application Ser. No. 60/482,235 filed Jun. 25, 2003.

STATEMENT REGARDING FEDERALLY SPONSORED RESEARCH OR DEVELOPMENT

Not Applicable.

BACKGROUND OF THE INVENTION

1. Field of the Invention

This invention relates generally to satellite broadcast systems and, more particularly, to a conditional access system for encrypting and decrypting data.

2. Related Art

A conditional access system is used to permit access to a transport stream only to subscribers who have paid for it. This is generally done by distributing the transport stream in encrypted form. Although any integrated receiver-decoder (IRD) that is connected to a satellite broadcast network can receive the encrypted transport stream, only the IRDs of those authorized subscribers are able to decrypt the encrypted transport stream. The IRD determines whether the encrypted transport stream should be decrypted and, if so, to decrypt it to produce a decrypted transport stream comprising information making up the broadcast program.

After a subscriber has purchased a service, a service provider sends messages to the subscriber's IRD with an authorization stream for the purchased services. The authorization stream may be sent with the transport stream or may be sent via a separate channel to an IRD. Various techniques have been used to encrypt the authorization stream. The authorization stream may include a seed as a key for a service of the service provider and an indication of what programs in the service the subscriber is entitled to receive. If the authorization stream indicates that the subscriber is entitled to receive the program of an encrypted transport stream, the IRD decrypts the encrypted transport stream using the received seed.

A well known problem concerning such conditional access systems is that the IRDs may suffer either carrier fades or be switched between carriers bearing the same instantiation of the service provider. It is therefore desirable for the IRDs to recover and pass a correctly decrypted transport stream to downstream processing stages as quickly as possible. However, the magnitude of time delay in the recoveries, on a typical large network (12,000 satellite IRDs) can be extremely long, such as one or two minutes in legacy systems. Other implementations of conditional access solve the problem of quick restoration of the IRD's decrypter by either risking that still-scrambled material may inadvertently be passed to the downstream processing stages, or consuming far more bandwidth in the transport stream to send cyphered seeds.

Hence, there is a need in the industry for an efficient and reliable technique for rapidly decrypting data after brief or extended loss of transport or authorization streams due to short carrier fades or switches. For that purpose, the conditional access system should allow the IRDs to quickly determine, after restoration of the data link following a carrier fade or switch, whether their stored copies of the decryption seeds are still current and correct. Furthermore, it is needed to greatly reduce the likelihood that the carrier fade or switch could prevent the IRD from getting at least one copy of its own messages without the need for consuming large amounts of bandwidth.

SUMMARY OF THE INVENTION

It is in view of the above problems that the present invention was developed. The present invention is a satellite broadcast conditional access system with key synchronization that allows the IRDs to quickly restart the decrypting process after short carrier fades and after carrier switches when they are within the same protected network. The invention uses an indexed authorization stream allowing the IRDs to quickly decide, after restoration of the data link following a carrier fade or switch, whether their stored copies of the decrypting seeds are still current and correct. The invention also uses multiple transmissions of the cyphered seeds during each distribution period providing the IRD with multiple opportunities to receive the current seed.

For the first attribute, the index numbers on all the authorization streams are assigned in a manner such that the authorization stream may be identified and that the specific time epoch of those cyphered seeds may be determined. When a conditional access server program initializes, it randomly selects the starting index number from a domain of numbers, and applies this number to each and every authorization stream bearing a cyphered seed. Then, while in operation, it increments that index by a predefined value at each new distribution period, i.e., an odd/even flavor switch according to the preferred embodiment. The IRDs, in their turn, after reestablishing connection to the carrier-borne transport stream, may quickly retrieve the index numbers being issued in the authorization stream and compare them to the same for both flavors of the cyphered seeds it keeps in volatile storage. If those numbers match, then the IRD will then immediately decypher those seed(s) and restart decrypting on the transport stream knowing it is using the correct seed. This restart may commence very quickly after the authorization stream is detected, and that the IRD need not wait until its own messages are received and decyphered.

For the second attribute, the distribution of the cyphered seeds is repeatedly sent with considerable delay between the cyphered seed messages. This greatly reduces the likelihood that a carrier switch or a short fade could prevent the IRD from getting at least one copy of its own cyphered seed message during each distribution period.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
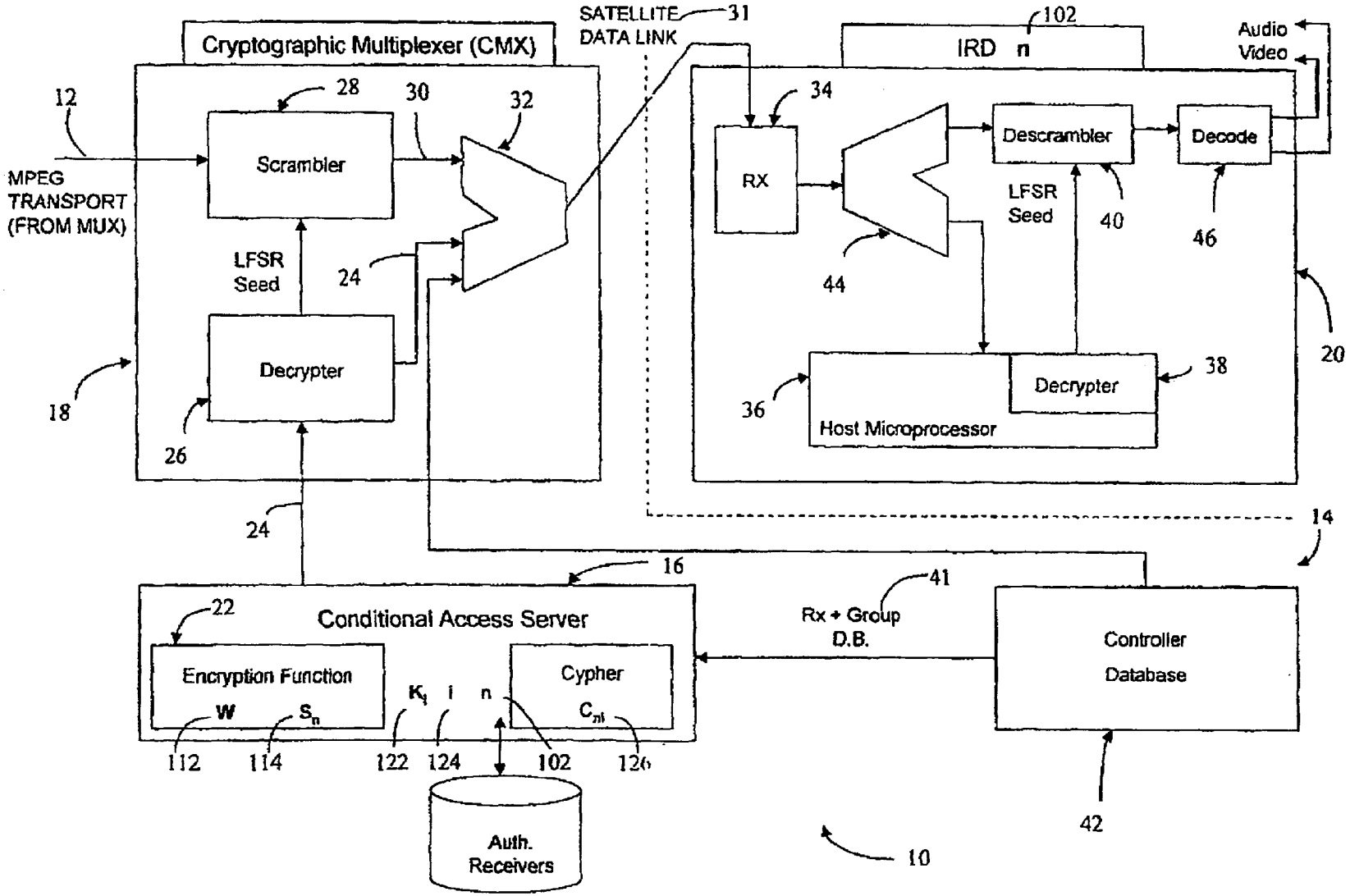
FIG. 1 illustrates a systematic diagram of a satellite broadcast conditional access system according to the present invention.

Referring to the accompanying drawings in which like reference numbers indicate like elements, FIG. 1 illustrates a systematic diagram of a satellite broadcast conditional access system 10 according to the present invention. The conditional access system 10 provides dynamic scrambling security to an entire MPEG transport stream 12. The conditional access system 10 generally consists of a server 14 and receivers 20. In a preferred embodiment of the invention, the server 14 is comprised of a conditional access server 16 and cryptographic multiplexers 18. The receivers 20 are generally referred to as integrated receiver-decoders (IRDs) 20.

The encryption function 22 in the conditional access server 16 provides an authorization stream 24 bearing cyphered messages which can only be decyphered and read by authorized devices. These messages give the cryptographic multiplexers 18, at the satellite uplink, and the authorized IRDs 20, at the downlink sites, a sequence of cyphered encrypting seeds. The cryptographic multiplexers 18 extract their own cyphered encryption seeds using their own serial number, and their decrypter 26 decyphers the cyphered encrypting seeds to get an encryption seed. These seeds initialize scrambler 28, in the cryptographic multiplexers 18 which appears to randomly encrypt the encrypt able portions of the MPEG transport stream 12. The authorization stream 24 and the encrypted transport stream 30 are transmitted through an interposed satellite broadcast network 31 by the multiplexer 32 and received by the input module 34 of the IRDs 20. Like the cryptographic multiplexers 18, the host microprocessor 36 of IRDs extract their own cyphered encryption seeds using their own serial number, and their decrypters 38 decypher the cyphered encrypting seeds to get an original encryption seed. Since the encrypting operation is symmetric, the encrypting seed sent to the IRDs 20 allows descrambler 40 to decrypt the transport stream encrypted by the cryptographic multiplexer 18.

Figure 2:
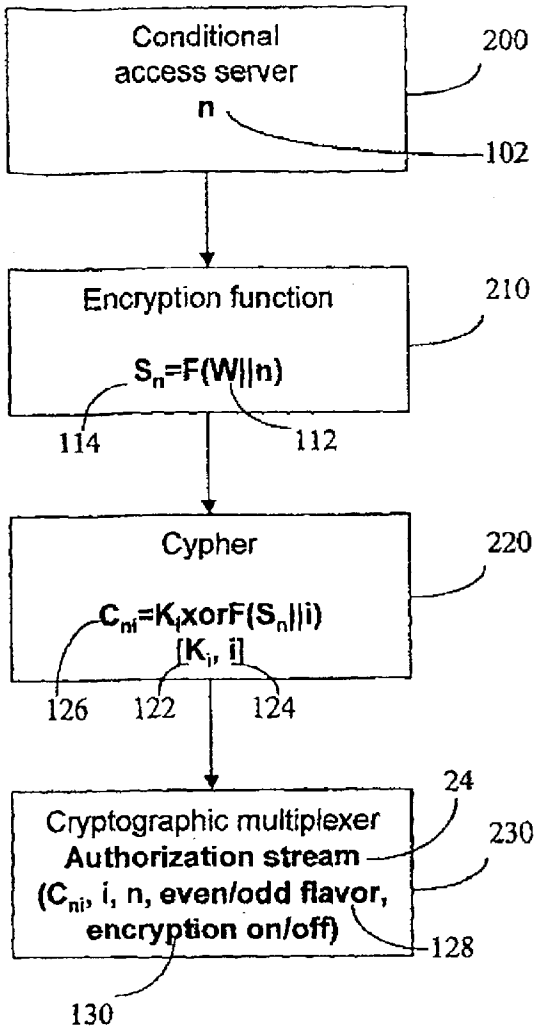
FIG. 2 illustrates a flowchart of operations that are performed at a conditional access server to generate authorization stream sent to cryptographic multiplexers.

At the uplink site, a conditional access server 16 runs the conditional access system 10. It can retrieve database information 41 from a conditional access database 42 by a network connection to the conditional access server 16 if on separate machines. This information is used to build and edit a list of authorized IRDs 20 by serial number n 102 under local operator control. FIG. 2 illustrates a flowchart of operations that are performed at a conditional access server 16 to generate authorization stream 24 sent to cryptographic multiplexers 18. At initialization, or after any change to the authorized list, the conditional access server 16 accesses its encryption function 22 (operation 200). This function contains a secret identification number W 112 unique to the particular customer (operation 210). In the case where the conditional access system 10 is controlled by a service provider and one or more customers are using the system, the secret identification number is only known by each respective customer and is not known to or accessible by any person at the service provider. The serial numbers 102 are reported to the encryption function 22 (operation 200) and, for each one, the encryption function 22 finds the encrypted serial number $S_n$ 114 by implementing the function $S_n$=F (W||n); where '||' is the concatenation operator, and where "F( )" is a one-way hash function, i.e., a function that is computationally easy to perform in one direction, but extremely difficult to reverse (operation 210). The encryption function 22 then provides the $S_n$'s 114 to the conditional access server 16.

When the conditional access server's encryption engine is activated, it generates a sequence of random numbers $K_i$ 122 and associated index numbers i 124 (operation 220). While each $K_i$ in the sequence is independently random, the i values preferably begin with a randomly selected number, i.e., the initial index number is randomly generated. In a preferred embodiment of the invention, the i index then increments by a given value, preferably one, for each new ($K_i$,i) pair 122, 124 that is generated. For each pair 122, 124 in the sequence, the conditional access server 16 creates a cyphered message for every authorized IRD 20 plus all encrypting cryptographic multiplexers 18. It does this using the list of secret serial numbers $S_n$ 114. Each cyphered message (CM) contains a value $C_{ni}$ 126, the index i, 124 the destination unit serial number n 102, and an even/odd flavor indicator 128. The value $C_{ni}$ is calculated (operation 220): $C_{ni}=K_i$ xor $F(S_n||i)$ and it is called the cyphered seed 126. After the entire set of cyphered messages is distributed, the conditional access server 16 sends either an encryption ON or OFF message 130, addressed to all. The aggregate of all these messages ($C_{ni}$ 126, i 124, n 102, an even/odd flavor indicator 128, an encryption ON or OFF message 130) is generally called the authorization stream 24. This stream then feeds the cryptographic multiplexers 18 (operation 230).

Figure 3:
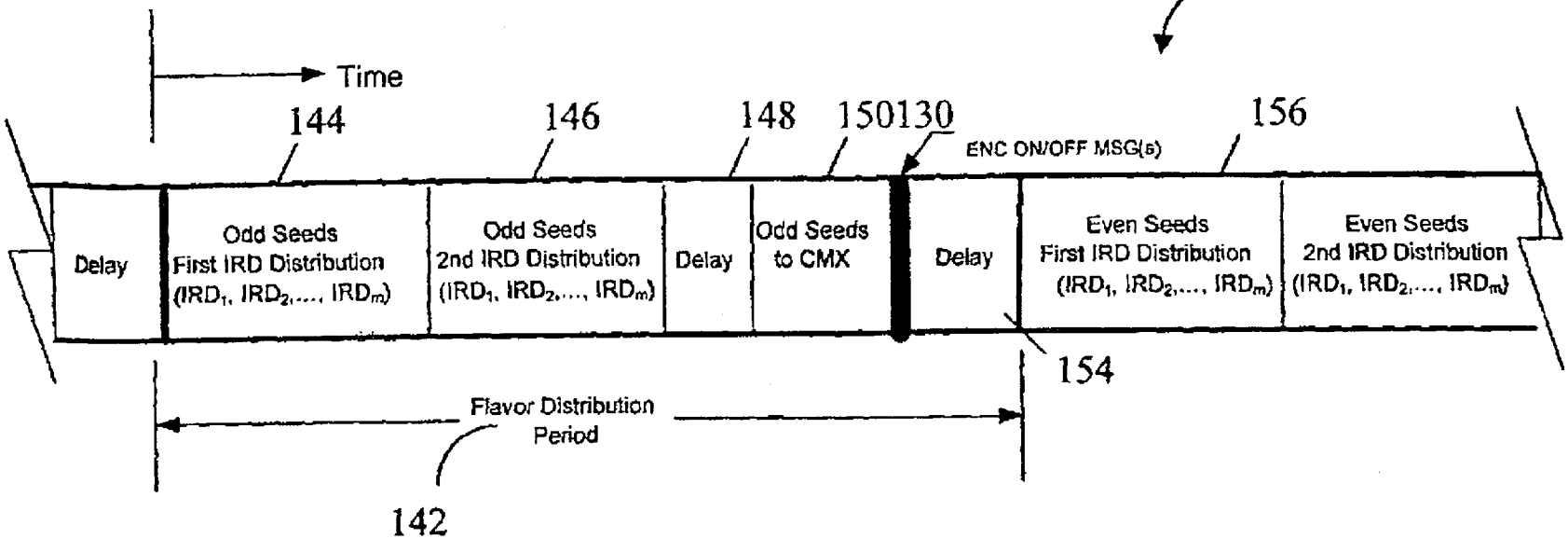
FIG. 3 illustrates a diagram of how authorization stream is structured during a flavor distribution period.

The authorization stream 24 is preferably structured as shown in FIG. 3. The time interval over which cyphered messages are used to distribute a ($K_i$,i) pair 122, 124 to the universe of IRDs 20 and cryptographic multiplexers 18 is the odd/even flavor distribution period 142. Within this period, all the cyphered messages 144 intended for the downlink IRDs 20 are sent first as an ordered group. The ordered group is a set of cyphered messages ($CM_1$, $CM_2$, . . . , $CM_m$) corresponding with the group of IRDs ($IRD_1$, $IRD_2$, . . . , $IRD_m$), respectively. For each distribution period, the cyphered messages will all contain the same index number and even/odd flavor indicator, but will vary according to the $IRD_n$ serial numbers ($S_{n1}$, $S_{n2}$, . . . , $Sn_{nm}$). Of course, the cyphered seed 126 will also vary according to the different serial numbers based on operation 220. Then that whole set of messages 146 is repeated in the same order. Following this, there is a delay period 148 where no messages are transmitted. Then cyphered messages 150 addressed to all the cryptographic multiplexers 18 listed in the conditional access database 42 are sent, in order, just once. This is followed preferably, without delay, by some number of encryption ON or OFF commands 130. After this, there is another delay 154 before transmission of the next ($K_i$,i) pair 122, 124 begins, which preferably has the opposing odd/even flavor 156.

In a preferred embodiment of the invention, the conditional access system 10 may be in one of three states. They are (1) encryption off; (2) encryption on and starting up; (3) encryption on static. In the first state, the engine continues to create the ($K_i$,i) pairs 122, 124, but only a single encryption off authorization message is sent at the end of each distribution period. In the second state, the engine begins distribution of the encrypting seeds. At the end of the first two distribution periods, the conditional access server 16 sends an encryption off message 130 to all devices. After the second state, the conditional access system 10 enters the third state. Here, after the seeds have been distributed to the IRDs 20 and cryptographic multiplexers 18, an encryption on message 130 is sent to all devices. Note that there is no similar transition from the encryption on state to the off state. As soon as the user orders encryption to stop, distribution of new seeds ceases immediately and the very next authorization message sent is an encryption off message 130.

In the preferred embodiment of the invention, the list of all cryptographic multiplexers 18 which may do encryption is found in the associated conditional access database 42. The presence or absence of the cryptographic multiplexer 18 from conditional access system's authorized list does not mean the same thing as the presence or absence of an IRD 20, as shall be seen. If a cryptographic multiplexer 18 is in the conditional access database 42, then, when the conditional access state is encryption on, the cryptographic multiplexer 18 will always be receiving addressed authorization messages from the conditional access system 10. However, the cryptographic multiplexer behavior is then affected by the conditional access mode in use while encryption is on. In the preferred embodiment of the invention, only the authorized cryptographic multiplexers 18 receive addressed encryption on commands, while the unauthorized cryptographic multiplexers (in the conditional access database but not authorized in conditional access) receive addressed encryption off commands. For all networks logically connected to those unauthorized cryptographic multiplexers 18, this has the effect of leaving them completely in the clear (unencrypted).

The cryptographic multiplexer 18 has three functions within the conditional access system 10: (1) to receive and decypher the next encrypting seed, (2) to encrypt the required program IDs (PIDs) in the MPEG transport stream 12 using that seed, and to (3) inject the authorization stream into a ghost PID of the transport stream for use by the authorized IRDs. In support of these functions, the cryptographic multiplexer 18 accepts the authorization stream 24 from the conditional access server 16. In addition, it accepts an MPEG transport stream 12, provides the encrypting processing, and then outputs it, preferably for ultimate distribution to a network of downlink IRDs 20.

Figure 4:
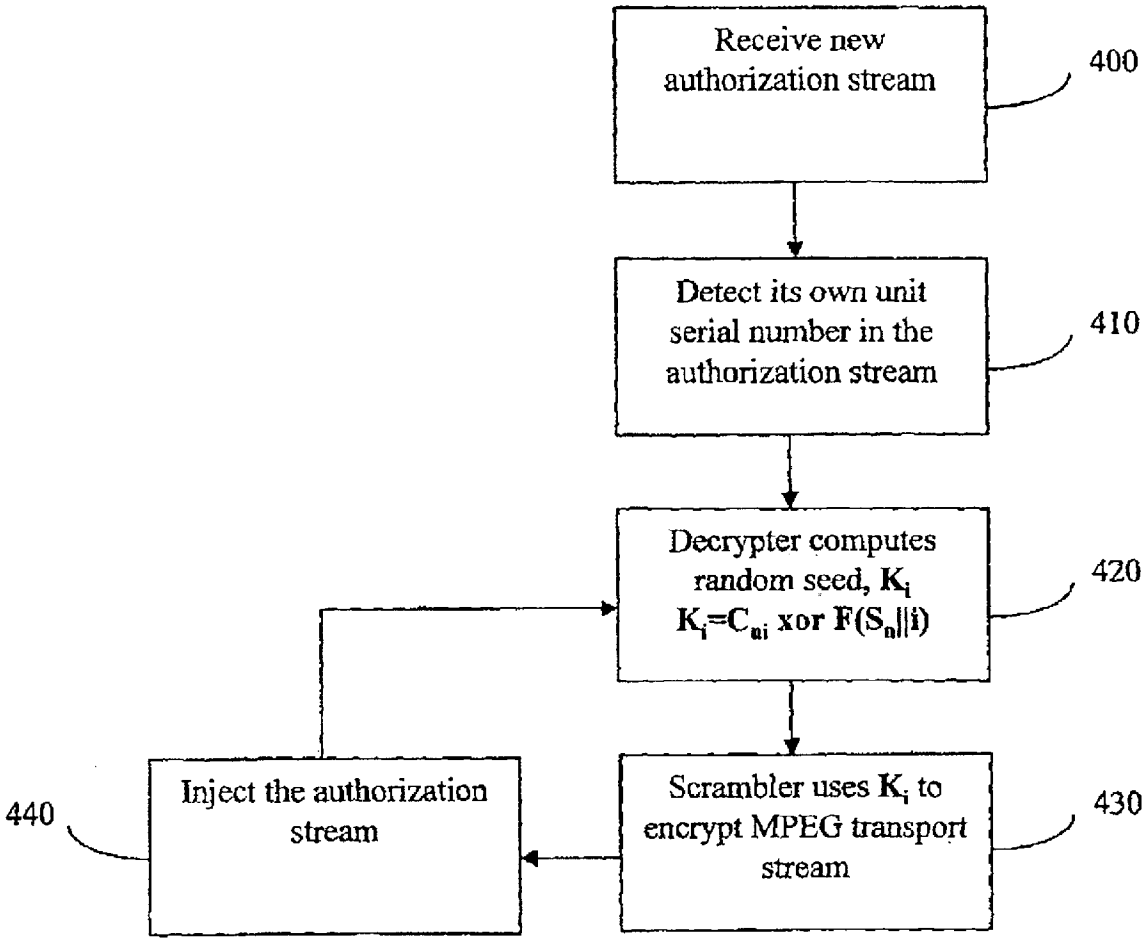
FIG. 4 illustrates a flowchart of operations that are performed to decypher authorization stream and encrypt transport stream using an encryption seed at a cryptographic multiplexer.

FIG. 4 illustrates a flowchart of operations that are performed to decypher authorization stream 24 and encrypt transport stream 12 using an encryption seed 122 at a cryptographic multiplexer 18. Near the end of the flavor distribution period 142 of a particular odd/even flavor 128, there is sequence of authorization streams 24 directed to cryptographic multiplexers 18. If the host processor in a cryptographic multiplexer receiving the stream detects it's own unit serial number n 102 in an authorization stream 24 (operations 400 and 410), then that stream is passed to a decrypter 26. This decrypter, when it was programmed at the factory, had been given the unit's pre-calculated, encrypted serial number $S_n$ 114. This is the same $S_n$ also calculated by the encryption function 22 in the conditional access server 16. So the decrypter 26 then takes the incoming ($C_{ni}$,i) pair and computes the corresponding $K_i$ 122 from the equation (operation 420): $K_i=C_{ni}$ xor $F(S_n||i)$. This is the same $K_i$ value which originated in the conditional access server 16. It is an encryption seed value 122, which is then loaded into the encrypting hardware, scrambler 28.

In a preferred embodiment of the invention, once the new encryption seed value is available, the host processor immediately sets the scrambler 28 to begin encrypting using that value if (1) the conditional access server 16 has previously sent an encryption ON command 130 more recently than an encryption OFF command, and (2) the cryptographic multiplexer 18 has been set to accept those commands. The encryption seed value used for encrypting is the starting state of a linear feedback shift register (LFSR) generator of the scrambler 28 (operation 430), a device which creates a pseudo-random bit sequence. This sequence of bits is XOR'd with several of the low-order bits in nearly every byte of the payload of the eligible MPEG packets 12, not including the authorization stream-carrying packets. The encryption bit on those packets is then set to indicate to IRD descrambler 40 that those packets are encrypted. In addition, the even-odd bit is set to show which flavor of seed was used to do that encrypting. When the next encryption seed is received by the cryptographic multiplexer 18, it will have the opposing flavor, and when transport streams are encrypted using that new encryption seed, the odd-even bit in the transport streams is toggled to that new opposing state.

While the cryptographic multiplexer 18 is decyphering new encryption seeds and using them to encrypt the transport stream 12, it is also injecting the authorization stream 24 into the transport (operation 440). This operates as a simple logical pipe from the cryptographic multiplexer host processor to all the IRD host processors 36. The authorization stream 24 is inserted as the payload into MPEG packets. As these packets are built, they are queued within the cryptographic multiplexer 18. Each authorized IRD 20 in the receiving network has three tasks to perform within this conditional access system 10: (1) extract and decypher its own authorization streams to get new encryption seeds, (2) decrypt the encrypted transport stream packets 30 and pass the new clear packets to the payload processing portion of the IRD 20, and (3) achieve and maintain synchronization to the timing of the cryptographic multiplexer scrambler 28, to ensure that decrypting is done with the correct seed.

Figure 5:
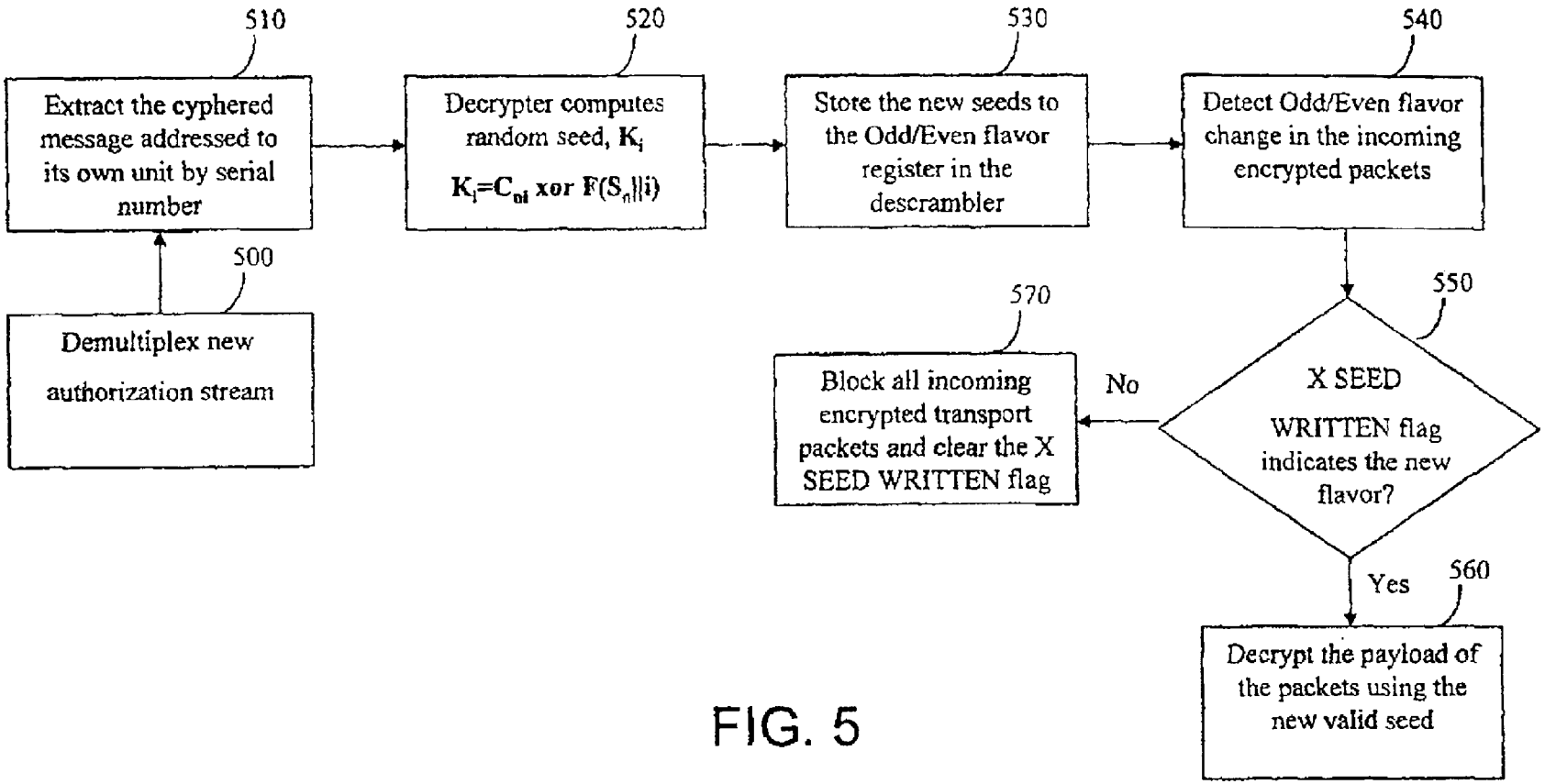
FIG. 5 illustrates a flowchart of operations that are performed at an IRD to decypher authorization stream and maintain IRD synchronization to the conditional access system in steady state operation.

FIG. 5 illustrates a flowchart of operations that are performed at an IRD 20 to decypher authorization stream 24 and maintain IRD synchronization to the conditional access system 10 in steady state operation. In each IRD 20 receiving the encrypted transport stream 30, the authorization stream 24 is demultiplexed out by the transport demux chip 44 (operation 500). This stream 24 is passed to the local host microprocessor 36 and it extracts the secret ($C_{ni}$,i) 126, 124 message addressed to that particular unit by serial number 102 (operation 510). In a preferred embodiment of the invention, every IRD's ($C_{ni}$,i) message is sent twice (refer to FIG. 3), which greatly reduces the likelihood that a carrier switch or a short fade could prevent the IRD 20 from getting at least one copy of its own cyphered seed message during each flavor distribution period. As received, cyphered messages are passed to the decrypter 38. This decrypter 38 is preferably identical to the decrypter 26 installed in cryptographic multiplexers 18. It proceeds to decypher the new $K_i$ seed values 122 in the same manner as the decrypter 26 within the cryptographic multiplexer 18 (operation 520). Those new seeds are then loaded to the odd/even flavor register in the descrambler 40 corresponding to that seed's flavor (operation 530). When this is done, a flag is set in the descrambler 40 to signal that a new valid seed of a particular odd/even flavor is available.

As described above, the IRD 20 detects authorization streams 24 addressed to itself and routes the enclosed ($C_{ni}$,i) pair 126, 124 to the decrypter 38. In addition, it maintains a circular buffer in volatile memory where the last messages received of each odd/even flavor are stored. When new messages are received, they overwrite the previous message of the same flavor. The purpose of this, which shall be discussed in more detail below, is to provide a way for IRDs 20 to recover from brief losses of transport stream input and, of course, loss of the authorization stream as well.

The IRD 20 accepts an incoming MPEG transport stream 12, either from a satellite carrier or from a terrestrial interface. It applies a process of decrypting the transport stream which is essentially identical to the encrypting operation. The payload of the transport stream packets are XOR'd by the same pseudo-random bit sequence which encrypted them jin the cryptographic multiplexer 18. This process restores the payloads of those transport stream packets back to the clear or normal state. Those packets are then routed to the downstream processing circuitry 46 within the IRD 20.

IRD synchronization to the conditional access system 10 differs depending on the state of the system. Steady state operation of an authorized IRD 20 and the several transient states are discussed in detail below: (1) authorization by conditional access system, (2) de-authorization by conditional access system, (3) brief transport stream loss, and (4) extended transport stream loss.

In steady state operation of the system, authorization streams bearing the cyphered seeds of a particular flavor are distributed to the cryptographic multiplexers 18 and IRDs 20 while those same units are encrypting and decrypting with the previously distributed seed of the opposing odd/even flavor. Within the IRDs themselves, the synchronization is maintained as follows. When a seed of a particular flavor is received, decyphered, and loaded to the IRD 20, an X_SEED_WRITTEN flag is SET within the IRD 20 (where X designates the seed's odd/even flavor). When the IRD detects that the odd/even flavor bit in the incoming encrypted transport streams changes (operation 540, referring to FIG. 5), it looks to see if the X_SEED_WRITTEN flag corresponding to the new flavor is set (test 550). If so, it knows it has a valid seed for that new flavor, and it begins decrypting immediately (operation 560). If not, it blocks all incoming encrypted transport streams 30 from entering the IRD demux chip 44 and clears the X_SEED_WRITTEN flag (operation 570). When the very next flavor change occurs in the incoming encrypted transport packet stream 30, that same flag clears in anticipation of the distribution of the next seed of that flavor.

Figure 6:
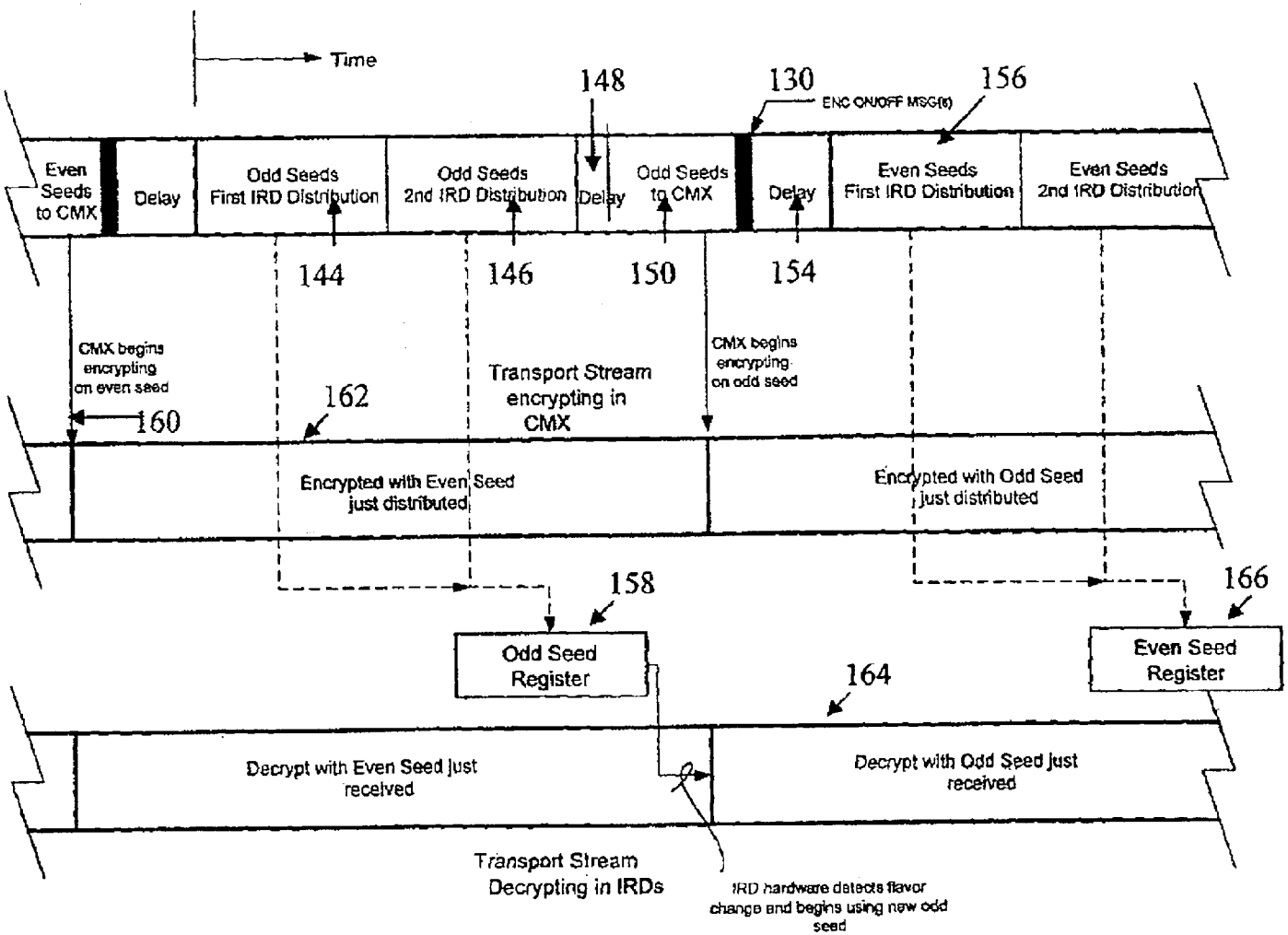
FIG. 6 illustrates a diagram of conditional access system timing for key synchronization when an authorization stream is distributed and a transport stream is encrypted at the cryptographic multiplexer and decrypted at the IRD.

FIG. 6 illustrates a diagram of conditional access system timing for key synchronization when an authorization stream is distributed and a transport stream is encrypted at the cryptographic multiplexer 18 and decrypted at the IRD 20. The new odd seed is written to odd seed register 158, setting the ODD_SEED_WRITTEN flag. At that moment, the incoming transport stream is still being encrypted with the previous even seed 160 at the cryptographic multiplexer 18 during an even flavor period 162. Later, the transport stream flavor 128 switches from even to odd. The odd seed then begins being used to decrypt at the IRD 20 during an odd flavor period 164. At the next flavor switch within the transport stream, from odd back to even, the ODD_SEED_WRITTEN flag will be cleared. But the authorization stream distribution period 164 for odd seeds is just beginning, and soon a new odd seed will be received, setting the flag once again. At that time, new even seed is written to even seed register 166, setting the EVEN_SEED_WRITTEN flag.

When an IRD 20 is unauthorized in the conditional access system 10, it does not receive the cyphered authorization streams, addressed to itself, bearing its own ($C_{ni}$,i) value pair. Without the ($C_{ni}$,i) pair 126, 124, seeds cannot be decyphered, so the X_SEED_WRITTEN flags remain continuously clear, and the IRD removes all incoming encrypted transport streams and substitutes null streams. When the IRD 20 is first authorized in the conditional access system 10, authorization streams addressed to it begin to be received. In the flavor distribution period corresponding to the first addressed stream received by the IRD 20, the IRD basically performs the following steps: (1) a seed of a particular flavor is later received, decyphered, and loaded to the descrambler 40, setting that respective X_SEED_WRITTEN flag; (2) the odd/even flavor bit in the incoming encrypted transport stream packets later changes over to that flavor; and (3) the seed is used to decrypt the encrypted transport streams. Starting with the steady state described earlier, when an RD 20 is de-authorized by conditional access system 10, it stops receiving authorization streams.

Figure 7:
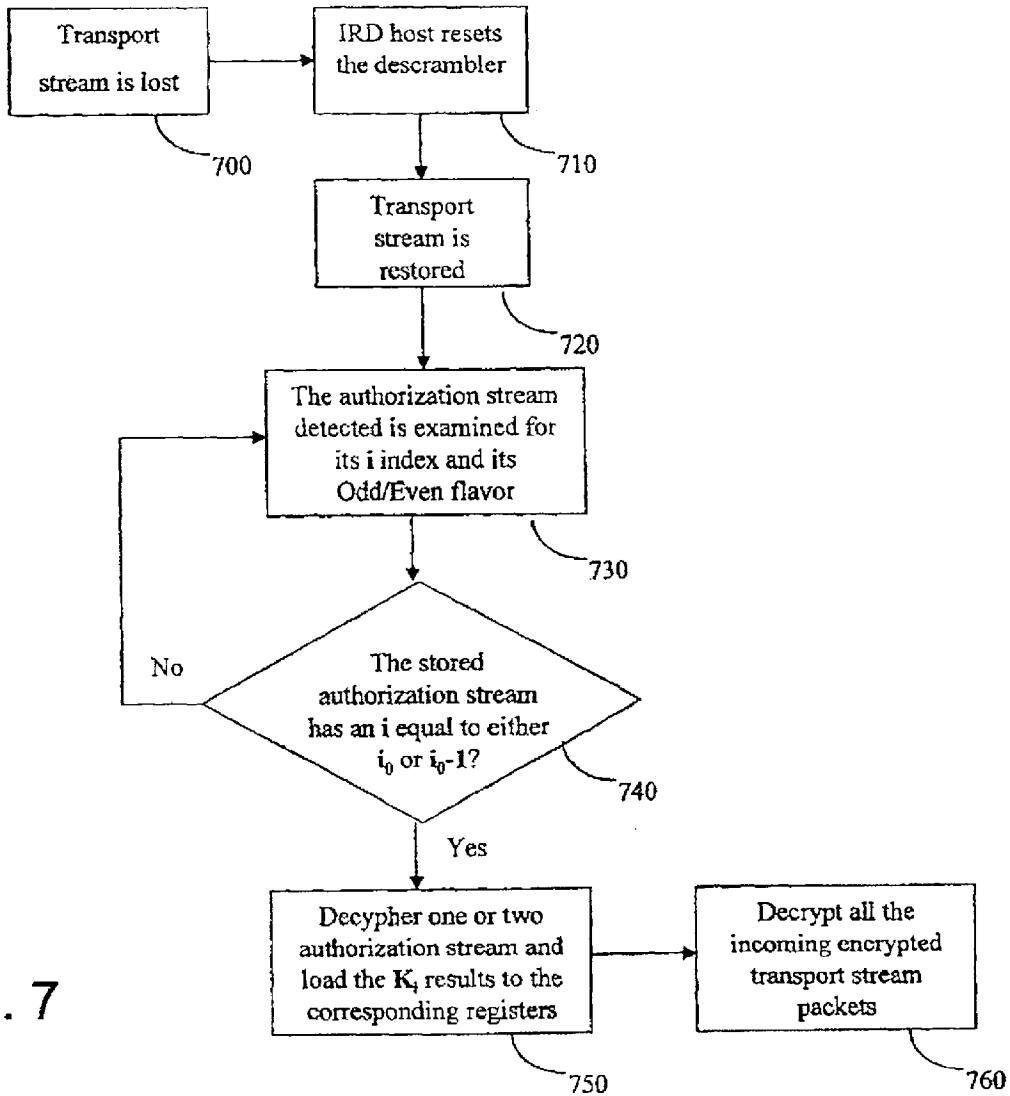
FIG. 7 illustrates a flowchart of operations that are performed at the IRD to rapidly decrypt data by key synchronization and indexing after brief or extended loss of transport stream.

Since the IRDs 20 may suffer either short carrier fades or deliberate carrier switches between carriers bearing the same instantiation of a conditional access system 10, transport streams could be briefly lost. FIG. 7 illustrates a flowchart of operations that are performed at the IRD 20 to rapidly decrypt data by key synchronization and indexing after brief or extended loss of transport stream. When the transport stream is first lost (operation 700), the IRD host 36 resets the descrambler 40 (operation 710). This clears the X_SEED_WRITTEN flags and will block encrypted transport packets from entering the IRD demux chip 44. But, authorization stream will not be blocked. Later, when the host 36 detects the restored transport stream (operation 720), it will begin monitoring the authorization stream channel (if available). The first authorization stream 24 detected, even if not addressed to itself, will be examined for its i index 124 and its odd/even flavor 128 (operation 730). The IRD host 36 will then exploit the simple knowledge that if the currently distributed encryption seed has an index of $i_0$, then the current encrypting is being done using the seed associated with index $i_0-1$. If either of the stored authorization streams has an i index value equal to either $i_0$ or $i_0-1$ l (test 740), then the assumption is made that (1) the new transport stream bears the same authorization stream as before and (2) the IRD 20 already has the stored authorization streams corresponding at least to the current seed being used to encrypt. In this case, the IRD 20 then progresses through the following sequence: (1) the stored authorization streams whose i index values equal $i_0$ or $i_0-1$ are sent by the IRD host 36, in order of increasing magnitude, to the decrypter 38; (2) the decrypter 38 decyphers one or two authorization streams and the $K_i$ 122 results are loaded to the respective odd/even flavor encrypting register(s) (operation 750); (3) the X_SEED_WRITTEN flags corresponding to whichever flavor seed(s) was/were loaded are set; (4) the next arriving encrypted transport stream is treated as if it was logically an odd/even flavor change and, if the X_SEED_WRITTEN flag for the new incoming encrypting flavor is set; (5) the IRD descrambler 40 commences to decrypt all the incoming encrypted transport streams (operation 760). The IRD then functions as described in the steady state operation.

For all losses of transport streams, the X_SEED_WRITTEN flags are cleared, the IRD host 36 resets the descrambler 40. As just described, when the transport stream is restored, the IRD host 36 examines the first authorization streams received. In the case where the first incoming authorization stream's i index value is not exactly equal to, or is not equal to one more than either of the i index values in the stored authorization streams, then the IRD host 36 assumes that the stored cyphered seeds are unusable. From then on, it behaves as if it had just boot up. The IRD 20 remains unauthorized until the IRD first gets an addressed cyphered seed through authorization stream and, thence until the succeeding transport encrypting flavor switch. Note that this holds true if the IRD 20 switched to an encrypted transport stream with a different authorization stream, or if the IRD 20 has been disconnected from the original authorization stream for an extended period. In a preferred embodiment of the invention, an extended period would be any outage exceeding half of the difference between flavor distribution period 142 and the total delays 148, 154 where double-sending of the cyphered seeds is employed (referring to FIG. 3). Failing to use double-sending of the seeds could cause an IRD 20 to miss its current seed distribution on even the shortest outages. In this case, the IRD 20 will appear to initially recover after an outage, but revert to unauthorized at the next flavor switch and remain that way through that next flavor distribution period.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of encrypting data for rapid decryption, the method comprising the steps of:

sequentially generating a plurality of random numbers;

sequentially generating a plurality of index numbers respectively associated with said random numbers, wherein a first index number is initially generated and said index numbers increment by a predefined value;

calculating a plurality of cyphered seeds according to a combination of each one of said random numbers and each one of said respectively associated index numbers;

sending said plurality of cyphered seeds and said corresponding index numbers from a server to at least one receiver; and resending each one of said plurality of cyphered seeds and said corresponding index numbers from said server to said receiver, wherein a cyphered seed and index number pair is resent before sending a subsequent cyphered seed and index number pair.

2. The method according to claim 1, wherein said generating of said index numbers is further comprised of the step of randomly generating said first index number.

3. The method according to claim 1, wherein said sending and resending steps further comprise the steps of sending a first flavored cyphered seed and index number pair and resending said first flavored cyphered seed and index number pair.

4. The method according to claim 3, wherein said sending and resending steps further comprise the steps of: sending a second flavored cyphered seed and index number pair; resending said second flavored cyphered seed and index number pair; and repeating said sending and resending steps for a plurality of first flavored cyphered seed and index number pairs and for a plurality of second flavored cyphered seed and index number pairs.

5. The method according to claim 1, further comprising the steps of: decyphering said cyphered seed and index number pair; storing said decyphered seed and index number pair in a memory; repeating said decyphering and storing steps for a plurality of subsequent cyphered seed and index number pairs until an occurrence of a reset; after said reset, decyphering a most recently received index number and comparing said most recently received index number with said stored index number; and continuing with said decyphering and storing steps if said most recently received index number is within a defined tolerance of said stored index number.

6. The method according to claim 5, further comprising the steps of: when a cyphered seed of a particular flavor is received, decyphered, and loaded to said receiver, setting a flavor seed flag to designate said flavor; and when said receiver detects that a flavor in incoming encrypted transport streams changes to a new flavor, examining whether said flavor seed flag is set to correspond said new flavor for checking if said decyphered seed is valid to decrypt said incoming encrypted transport streams.

7. The method according to claim 5, further comprising the step of defining said tolerance of said stored index number to one.

8. The method according to claim 5, further comprising the steps of: sending a group of cyphered seed and corresponding index number pairs from said server to a respective group of receivers during a flavor distribution period; resending said group of cyphered seed and corresponding index number pairs to said respective group of receivers during said flavor distribution period; and repeating said sending and resending steps for a plurality of subsequent groups of cyphered seed and corresponding index number pairs to said respective group of receivers.

9. The method according to claim 8, wherein said repeating step further comprises the step of switching between a first flavor and a second flavor.

10. The method according to claim 8, further comprising the step of sending an authorization stream from said server to said group of receivers during said flavor distribution period, said authorization stream comprising said group of cyphered seed and corresponding index number pairs, a plurality of serial numbers corresponding to said respective group of receivers, a flavor indicator, and an encryption on/off message.

11. The method according to claim 10, further comprising the step of indicating to said group of receivers whether corresponding transport streams are encrypted according to said encryption on/off message.

12. The method according to claim 10, further comprising the step of generating a plurality of secret serial numbers according to a combination of a secret identification number and a serial number associated with each of said receivers.

13. The method according to claim 12, further comprising the step of allowing a customer controlling said group of receivers to generate said secret identification number unique to said customer.

14. The method according to claim 12 wherein said step for calculating a plurality of cyphered seeds is further comprised of the step of combining each one of said random numbers and said respectively associated index numbers with each one of said secret serial numbers.

15. A method of encrypting data for rapid decryption, the method comprising the steps of: sequentially generating a plurality of random numbers; sequentially generating a plurality of index numbers respectively associated with said random numbers, wherein a first index number is initially generated and said index numbers increment by a predefined value; calculating a plurality of cyphered seeds according to a combination of each one of said random numbers, each one of said respectively associated index numbers, and a plurality of serial numbers respectively associated with a group of receivers; sending a group of cyphered seed and corresponding index number pairs from a server to said group of receivers during a flavor distribution period; resending said group of cyphered seed and corresponding index number pairs to said group of receivers during said flavor distribution period; repeating said sending and resending steps for a plurality of subsequent groups of cyphered seed and corresponding index number pairs to said group of receivers, extracting a cyphered seed using its serial number from said cyphered seed and index number pairs in each one of said receivers; decyphering said cyphered seed and index number pairs in each one of said receivers; storing said decyphered seed and index number pair in a memory of each one of said receivers; repeating said decyphering and storing steps for a plurality of subsequent cyphered seed and index number pairs until an occurrence of a reset; after said reset, decyphering a most recently received index number and comparing said most recently received index number with said stored index number; and continuing with said decyphering and storing steps if said most recently received index number is within a defined tolerance of said stored index number.

16. The method according to claim 15, wherein said generating of said index numbers is further comprised of the step of randomly generating said first index number.

17. The method according to claim 15, further comprising the step of sending an authorization stream from said server to said group of receivers during said flavor distribution period, said authorization stream comprising said group of cyphered seed and corresponding index number pairs, said plurality of serial numbers corresponding to said respective group of receivers, a flavor indicator, and an encryption on/off message.

18. The method according to claim 15, further comprising the step of generating a plurality of secret serial numbers according to a combination of a secret identification number and a serial number associated with each of said receivers.

19. The method according to claim 18, further comprising the step of allowing a customer controlling said group of receivers to generate said secret identification number unique to said customer.

20. The method according to claim 18, wherein said secret serial numbers are used as said serial numbers in calculating said cyphered seeds.

21. The method according to claim 15, further comprising the steps of: receiving, decyphering, and loading at least one of said cyphered seeds of an indicated flavor in each one of said receivers; respectively setting a flavor seed flag in each one of said receivers to designate said indicated flavor; detecting a flavor change associated with a new flavor in incoming encrypted transport streams in each one of said receivers; determining whether said flavor seed flag is set to correspond with said new flavor and whether said decyphered seed is valid in each one of said receivers; and decrypting said incoming encrypted transport streams in each one of said receivers when said decyphered seed is valid.

22. The method according to claim 15, further comprising the step of defining said tolerance of said stored index number to one.

23. A system for encrypting and decrypting data, comprising: means for sequentially generating a plurality of random numbers and a plurality of index numbers respectively associated with said random numbers, wherein a first index number is initially generated and said index numbers increment by a predefined value; means for calculating a plurality of cyphered seeds according to a combination of each one of said random numbers, each one of said respectively associated index numbers, and a plurality of serial numbers respectively associated with a group of receivers; means for sending a group of cyphered seed and corresponding index number pairs from a server to said group of receivers during a flavor distribution period, and resending said group of cyphered seed and corresponding index number pairs to said group of receivers during said flavor distribution period; means for extracting a cyphered seed and corresponding index number from said cyphered seed and index number pairs, wherein at least one of said serial numbers is used to extract said cyphered seed; a decrypter in operative communication with said extracting means receives said extracted cyphered seed and said index number and decyphers said cyphered seed into a decyphered seed; a memory device in operative communication with said decrypter receives and stores said decyphered seed and index number; means for setting a reset command and thereafter comparing a new index number with said stored index number according to a defined tolerance.

24. The system according to claim 23, wherein said first index number is further comprised of a randomly generated number.

25. The system according to claim 23, wherein said means for generating said random numbers and said index numbers is comprised of a server with a computer processor.

26. The system according to claim 23, wherein said means for calculating said cyphered seeds is comprised of an encryption function in said server.

27. The system according to claim 23, wherein said means for sending and resending said cyphered seed and index number pairs from said server to said receivers is comprised of a multiplexer controlled by said server.

28. The system according to claim 23, wherein said means for extracting said cyphered seed, setting said reset command, and returning to said steady state operation is comprised of a host microprocessor in at least one of said receivers.

29. The system according to claim 23, wherein said defined tolerance of said stored index number is one.

30. The system according to claim 23, wherein said plurality of serial numbers are further comprised of a combination of a secret identification number, and wherein said secret identification number is unique to a customer controlling said group of receivers.

31. A server for encrypting data, comprising: means for sequentially generating a plurality of random numbers and a plurality of index numbers respectively associated with said random numbers, wherein a first index number is initially generated and said index numbers increment by a predefined value; means for calculating a plurality of cyphered seeds according to a combination of each one of said random numbers and each one of said respectively associated index numbers; and means for sending a group of cyphered seed and corresponding index number pairs from a server to a respective group of receivers during a flavor distribution period, and resending said group of cyphered seed and corresponding index number pairs to said respective group of receivers during said flavor distribution period.

32. The system according to claim 31, wherein said first index number is further comprised of a randomly generated number.

33. The system according to claim 31, wherein said cyphered seeds are further comprised according to a combination of said random numbers and said index numbers with a plurality of serial numbers respectively associated with said group of receivers.

34. The system according to claim 33, wherein said plurality of serial numbers are further comprised of a combination of a secret identification number, and wherein said secret identification number is unique to a customer controlling said group of receivers.

35. An integrated receiver decoder for decrypting data, comprising: means for extracting a cyphered seed and a corresponding index number from a group of cyphered seed and index number pairs; wherein a plurality of serial numbers are used to generate a plurality of cyphered seeds and wherein at least one of said serial numbers is used to extract said cyphered seed; a decrypter in operative communication with said extracting means receives said extracted cyphered seed and said corresponding index number and decyphers said cyphered seed into a decyphered seed; a memory device in operative communication with said decrypter receives and stores said decyphered seed and index number; and means for setting a reset command and thereafter comparing a new index number with said stored index number according to a defined tolerance.

36. The system according to claim 35, wherein said defined tolerance of said stored index number is one.

*37. A computer-implemented method, comprising:*

*sending, by an access server, one or more ciphered seeds and one or more index numbers associated with the one or more ciphered seeds to at least one content receiver; and*

*resending, by the access server, the one or more ciphered seeds and the one or more index numbers, wherein a ciphered seed and index number pair are sent before sending subsequent ciphered seed and index number pairs.*

*38. The computer-implemented method as recited in claim 37, further comprising determining one or more ciphered seeds by:*

*sequentially generating a plurality of random numbers;*

*sequentially generating a plurality of index numbers associated with the random numbers; and*

*combining each random number with each index number associated with the random number.*

*39. The computer-implemented method as recited in claim 38, wherein a first index number is generated randomly and subsequent index numbers are generated by incrementing the first index number by a value.*

*40. The computer-implemented method as recited in claim 37, wherein the one or more ciphered seeds and the one or more index numbers are sent and resent during a first flavor distribution period.*

*41. The computer-implemented method as recited in claim 40, further comprising:*

*sending, by the access server, a ciphered seed and an index number pair during a second flavor distribution period; and*

*resending, by the access server, the ciphered seed and the index number pair during the second flavor distribution period.*

*42. The computer-implemented method as recited in claim 37, further comprising sending, by the access server, an authorization stream, the authorization stream comprising the one or more ciphered seeds, the one or more index numbers, one or more numbers associated with one or more content receivers, a flavor indicator, and an encryption message.*

*43. The computer-implemented method as recited in claim 42, wherein the one or more numbers associated with one or more content receivers are configured to enable decryption of the one or more ciphered seeds.*

*44. The computer-implemented method as recited in claim 42, wherein the flavor indicator is configured to indicate an odd/even flavor of the one or more ciphered seeds.*

*45. The computer-implemented method as recited in claim 42, wherein the encryption message is configured to indicate whether a transport stream is encrypted.*

*46. A system for encrypting data, comprising:*

*an access server configured to generate one or more ciphered seeds; and*

*a cryptographic multiplexer configured to:*

*send the one or more ciphered seeds and one or more index numbers to one or more content receivers during a flavor distribution period; and*

*resend the one or more ciphered seeds and the one or more index numbers to the one or more content receivers during the flavor distribution period.*

*47. The system as recited in claim 46, wherein the cryptographic multiplexer is further configured to:*

*send a ciphered seed and an index number pair during a second flavor distribution period; and*

*resend the ciphered seed and the index number pair during the second flavor distribution period.*

*48. A computer-implemented method, comprising:*

*receiving, by a content receiver, an encrypted data stream;*

*extracting, by the content receiver, a ciphered seed and index number pair from the encrypted data stream using a number associated with the content receiver;*

*deciphering, by the content receiver, the ciphered seed to create a deciphered seed;*

*storing, by the content receiver, the deciphered seed and index number in memory;*

*detecting, by the content receiver, a reset, and responsive to the reset:*

*comparing a received index number with the stored index number; and*

*deciphering and storing additional ciphered seeds responsive to the received index number corresponding to the stored index number.*

*49. The computer-implemented method, as recited in claim 48, wherein the received index number corresponds to the stored index number when the received index number is within a defined tolerance of the stored index number.*

*50. The computer-implemented method, as recited in claim 49, wherein the defined tolerance is one.*

*51. The computer-implemented method, as recited in claim 48, further comprising deciphering and storing, by the content receiver, additional ciphered seed and index number pairs until a reset is detected.*

*52. The computer-implemented method, as recited in claim 48, further comprising:*

*deciphering, by the content receiver, a ciphered seed corresponding to a first flavor;*

*detecting, by the content receiver, a second flavor;*

*determining, by the content receiver, whether the deciphered seed is valid by comparing the second flavor with the first flavor; and*

*decrypting, by the content receiver, the encrypted data stream responsive to the deciphered seed being valid.*

*53. The computer-implemented method, as recited in claim 52, further comprising blocking, by the content receiver, the encrypted data stream responsive to the deciphered seed being invalid.*

*54. A system for decrypting data, comprising:*

*a demultiplexer configured to extract a ciphered seed from an encrypted data stream using a number associated with a content receiver;*

*a decrypter configured to decipher the extracted ciphered seed;*

*a processor configured to:*

*detect a reset; and*

*validate the deciphered seed responsive to the reset; and*

*a descrambler configured to decrypt the encrypted data stream using the deciphered seed responsive to the deciphered seed being valid.*

*55. The system, as recited in claim 54, wherein the processor is configured to validate the deciphered seed by comparing an index number associated with the deciphered seed with a stored index number.*

*56. The system, as recited in claim 55, wherein the processor is configured to validate the deciphered seed by comparing the index number associated with the deciphered seed with the stored index number according to a defined tolerance.*

*57. The system, as recited in claim 54, wherein the processor detects a reset responsive to not receiving an encrypted data stream.*

*58. The system, as recited in claim 54, wherein the processor detects a reset responsive to a change in an odd/even flavor associated with the encrypted data stream.*

*59. The system, as recited in claim 54, wherein the descrambler is further configured to block an encrypted data stream responsive to the deciphered seed being invalid.*

*60. A computer-implemented method, comprising:*

*detecting, by a content receiver, a loss of an encrypted data stream;*

*determining, by the content receiver, an index number and odd/even flavor associated with a restored encrypted data stream;*

*determining, by the content receiver, whether the index number corresponds to a stored index number; and*

*decrypting, by the content receiver, the restored encrypted data stream using an encryption seed corresponding to the stored index number if the index number corresponds to the stored index number.*

*61. The computer-implemented method as recited in claim 60, wherein an index number ($i$) corresponds to a stored index number ($i_0$) when the index number ($i$) is equal to $i_0$ or $i_0-1$.*

*62. The computer-implemented method as recited in claim 60, further comprising resetting, by the content receiver, a descrambler configured to descramble the encrypted data stream.*

*63. The computer-implemented method as recited in claim 60, further comprising blocking, by the content receiver, one or more encrypted data packets associated with the restored encrypted data stream.*

*64. The computer-implemented method as recited in claim 60, further comprising deciphering, by the content receiver, at least one authorization stream to acquire an encryption seed.*

*65. The computer-implemented method as recited in claim 60, further comprising waiting, by the content receiver, to receive an addressed ciphered seed responsive to the index number not corresponding to the stored index number.*

* * * * *